G. M. WOODS.
PROTECTIVE DEVICE.
APPLICATION FILED APR. 9, 1919.
1,428,869.  Patented Sept. 12, 1922.
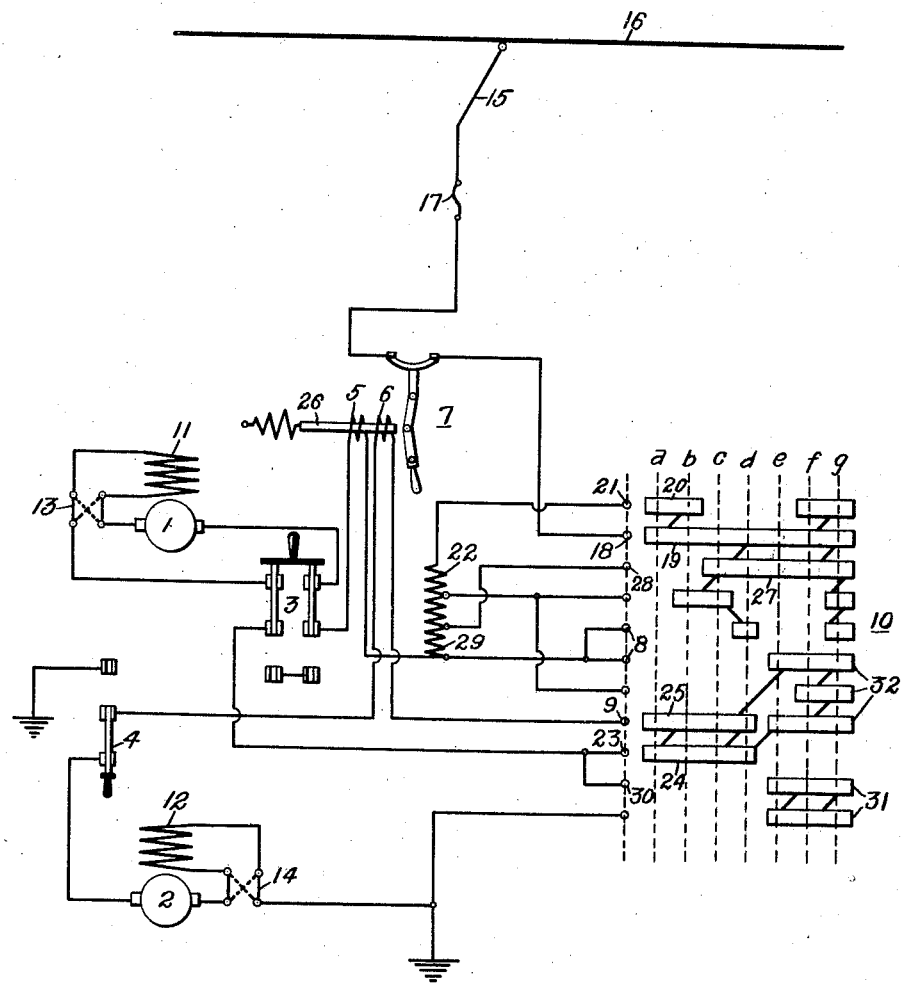
WITNESSES:
J. A. Helsel.
F. H. Miller
INVENTOR
George M. Woods.
BY
Wesley G. Carr
ATTORNEY Patented Sept. 12, 1922.

1,428,869

UNITED STATES PATENT OFFICE.

GEORGE M. WOODS, OF PITTSBURGH, PENNSYLVANIA, ASSIGNOR TO WESTINGHOUSE ELECTRIC & MANUFACTURING COMPANY, A CORPORATION OF PENNSYLVANIA.

PROTECTIVE DEVICE.

Application filed April 9, 1919. Serial No. 288,678.

*To all whom it may concern:*

Be it known that I, GEORGE M. WOODS, a citizen of the United States, and a resident of Pittsburgh, in the county of Allegheny and State of Pennsylvania, have invented a new and useful Improvement in Protective Devices, of which the following is a specification.

My invention relates to protective means for electrical control systems and it has for its object to provide a single means for adequately protecting a plurality of motors or other devices when the same are connected in series and in parallel.

Ordinarily, as in certain electric railway practice, where a plurality of motors are adapted for alternate series and parallel connection, a protective circuit interrupter is actuated by a force that is a function of the combined motor currents when the motors are connected in parallel. This arrangement affords very little protection to the motors when the same are connected in series.

In practicing my invention, I provide means whereby a single circuit interrupter may be responsive to an overload on motors or other electrical translating devices when the same are connected in series and in parallel relation. In other words, the actuating force of the protective means is a function of the load on the motors during any of the usual series and parallel relations in which the same may be connected.

The single figure of the accompanying drawings is a diagrammatic view of an electrical control system embodying my invention.

A control system embodying my invention comprises, in general, a plurality of motors 1 and 2, two only of which are illustrated but a greater number of which may be utilized, as in standard railway practice. The motors 1 and 2 are respectively connected, on one side, through switches 3 and 4 and actuating coils 5 and 6 of a circuit interrupter 7, to stationary contact fingers 8 and 9 of a controller 10 and, on the other side, through field coils 11 and 12 and reversing switches 13 and 14, to ground. The motor 2 is connected directly to ground from the switch 14 but, inasmuch as the motor 1 is normally connected in series or in parallel with the motor 2, it is connected to ground through the switch 3, the controller 10 and the motor 2. A trolley 15 engages a conductor 16 and is connected, through a fuse 17 and the circuit interrupter 7, to a stationary contact finger 18 of the controller 10.

In the position *a* of the controller 10, current passes through the finger 18, drum segments 19 and 20, a finger 21, a resistor 22, the coil 5, the switch 3, the armature of motor 1, the field coil 11, the switch 13, again through the switch 3, to a finger 23 of the controller 10, through segments 24 and 25, finger 9, the coil 6, the switch 4, the armature of motor 2, the field coil 12 and the switch 14 to ground.

In the position *a* and the succeeding positions *b*, *c* and *d*, in which the motors 1 and 2 are connected in series, the coils 5 and 6 are series-related elements in the circuit, and the combined magnetic effects thereof, in case of an overload, serve to actuate the interrupter 7 through a core member 26 thereof.

In the position *e* of the controller 10, current passes through the finger 18, the segments 19 and 27 and a finger 28 to a portion 29 of the resistor 22, from which point it divides, taking one path through the coil 5, the switch 3, the armature of motor 1, the field coil 11, the switch 13, again through the switch 3, to a contact finger 30 and segments 31 to ground and taking another path through the finger 8, segments 32, the finger 9, the coil 6, the switch 4, the armature of motor 2, the field coil 12 and the reversing switch 14 to ground.

In the positions *e*, *f* and *g* of the controller 10, in which the motors 1 and 2 are connected in parallel, the coils 5 and 6 are again in series with the respective motors 1 and 2, with which they are associated, and, consequently, function in accordance with the current through the individual motors in the same manner as when the latter operate in series, the actuation of the interrupter 7 being, as in the first described circuit, the result of the combined magnetic effects of the coils 5 and 6.

Single operation of either of the motors may be effected, and, at the same time, protection be obtained therefor, by the magnetic co-operation of the coils 5 and 6 by throwing either of the double-throw switches 3 and 4 to the closed position which is opposite to that indicated in the drawing.

With the switch 3 in its lower closed position and the controller 10 in the position a, current passes through the finger 18, the segments 19 and 20, the finger 21, the resistor 22, the coil 5, the switch 3, the contact finger 23, contact segments 24 and 25, the finger 9, the coil 6, the switch 4 and thence, through the motor 2, to ground. A similar circuit for the motor 1, and including the coils 5 and 6, may be established by throwing the switch 4 to its opposite closed position.

The arrangement permits a plurality of motors or other translating devices to be operated singly, in series or in parallel, and in any of the combinations of series and parallel circuits and to be adequately protected by a single protective device.

While I have shown and described a particular form of my invention, changes may be effected therein, without departing from the spirit and scope thereof, as set forth in the appended claims.

I claim as my invention:

1. The combination with a plurality of electrical translating devices adapted for single and co-ordinate operation in any combination thereof, of a circuit interrupter having a plurality of cumulatively disposed actuating coils, and means for connecting said devices and said coils in predetermined selective circuit relation in accordance with the connection of one or more of the translating devices with relation to each other.

2. The combination with a plurality of electrical translating devices, of a circuit interrupter having a plurality of actuating coils for producing a cumulative magnetic effect each of which is connected to one of said devices when the latter are connected in series and in parallel and all of which may be connected to one of said devices when said one is connected in circuit alone.

3. The combination with a plurality of electrical translating devices adapted for single and coordinate operation in any combination thereof, of a circuit interrupter having a plurality of cumulatively connected actuating coils each connected in series with one of said devices when the latter are connected in series and in parallel, and means for connecting all of said coils in series with one of said devices when said one is operated alone.

4. The combination with a plurality of electrical translating devices adapted for single and coordinate operation in any combination thereof, of a circuit interrupter having a plurality of cumulatively connected actuating coils connected one each in series with each of said devices when the latter are connected in any combination thereof, and means for connecting all of said coils in circuit with one of said devices when said one is operated alone.

5. The combination with a plurality of electrical translating devices and means for connecting the same in a circuit in series and in parallel relation, of a circuit interrupter comprising a plurality of electromagnetic devices having a cumulative magnetic pull and each connected to receive the current passing through a different one of said devices when the latter are connected in parallel and all of which may be placed in series with the circuit when said devices are operated singly and in series.

6. The combination with a plurality of electric motors and a controller for connecting and operating the same in series and in parallel, of a circuit interrupter having a plurality of cumulatively connected coils each connected in series relation to a different one of said motors when the latter are connected in parallel and all of the coils being connected in series in the circuit when the motors are operated in series, and a plurality of switches for connecting all of the coils in series with the circuit when any one of the motors is operated alone.

In testimony whereof, I have hereunto subscribed my name this 29th day of March, 1919.

GEORGE M. WOODS.